US012796684B2

(12) United States Patent
Werner et al.

(10) Patent No.: US 12,796,684 B2
(45) Date of Patent: Nov. 17, 2026

(54) TRIGEMINAL CUE FOR WILDLIFE REPELLENTS

(71) Applicants: The United States of America, as Represented by the Secretary of Agriculture, Washington, DC (US); Arkion Life Sciences, LLC, New Castle, DE (US)

(72) Inventors: Scott J. Werner, Wellington, CO (US); Kenneth E. Ballinger, Jr., East Wakefield, NH (US)

(73) Assignees: The United States of America, as Represented by the Secretary of Agrictulture, Washington, DC (US); Arkion Life Sciences, LLC, New Castle, DE (US)

( * ) Notice: Subject to any disclaimer, the term of this patent is extended or adjusted under 35 U.S.C. 154(b) by 531 days.

(21) Appl. No.: 18/223,654

(22) Filed: Jul. 19, 2023

(65) Prior Publication Data

US 2024/0023546 A1 Jan. 25, 2024

Related U.S. Application Data

(60) Provisional application No. 63/390,666, filed on Jul. 20, 2022.

(51) Int. Cl.

| | |
|---|---|
| ***A01N 33/06*** | (2006.01) |
| ***A01N 31/16*** | (2006.01) |
| ***A01P 17/00*** | (2006.01) |

(52) U.S. Cl.

CPC ............. *A01N 33/06* (2013.01); *A01N 31/16* (2013.01); *A01P 17/00* (2021.08)

(58) Field of Classification Search

CPC ........ A01N 33/06; A01N 31/16; A01N 35/06; A01P 17/00

See application file for complete search history.

(56) References Cited

U.S. PATENT DOCUMENTS

| | | | |
|---|---|---|---|
| 4,965,070 | A | 10/1990 | Messina |
| 2015/0196026 | A1 | 7/2015 | Ballinger, Jr. et al. |

FOREIGN PATENT DOCUMENTS

| | | |
|---|---|---|
| WO | 2004000014 | 12/2003 |

OTHER PUBLICATIONS

Kazumi Osada et al., The scent of wolves pyrazine analogs induce avoidance and vigilance behaviors in prey, Front. Neurosci. 2015, 9, 363. (Year: 2015).*

Ahmad et al, Brazilian J. Biology 2018, 78, 4, 667-672 (Year: 2018).*

J. G. Kim, Non-lethal chemical bird aversion compositions, KR20030050331A, 2003, Machine translation obtained from USPTO STIC translation services (Year: 2003).*

International Search Report and Written Opinion based on PCT International Application No. PCT/US23/28116, dated Oct. 23, 2023, pp. 1-17.

Sayre, Roger W., et al., "Effect of Primary and Secondary Repellents on European Starlings: An Initial Assessment", The Journal of Wildlife Management, Jul. 2001, vol. 65, No. 3, pp. 461-469.

Avery, Michael L., et al., "Methyl Anthranilate as a Rice Seed Treatment to Deter Birds", The Journal of Wildlife Management, Jan. 1995, vol. 59, No. 1, pp. 50-56.

* cited by examiner

*Primary Examiner* — James H Alstrum-Acevedo
*Assistant Examiner* — Allen Chao
(74) *Attorney, Agent, or Firm* — McCarter & English, LLC

(57) ABSTRACT

In certain aspects, the present disclosure relates to a composition comprising a first compound that is a trigeminal nerve irritant, a second compound that is an animal repellent, and an acceptable carrier. The disclosure also relates to methods of repelling an animal from a substrate comprising applying to a substrate the compositions comprising a trigeminal nerve irritant and an animal repellent as described herein.

12 Claims, No Drawings

TRIGEMINAL CUE FOR WILDLIFE REPELLENTS

REFERENCE TO RELATED APPLICATIONS

This application claims priority to U.S. Provisional Patent Application No. 63/390,666 filed on Jul. 20, 2022, the contents of which are incorporated herein in their entirety.

BACKGROUND

Wild animals cause various problems such as damage to farm products due to the intrusion of animals onto agricultural lands, accidents due to the intrusion of animals into roads and railroads, and damage due to the intrusion of animals into residences. Accordingly, a need exists for safe, effective and affordable compositions and methods for repelling animals and managing human-wildlife conflicts.

SUMMARY OF THE INVENTION

In certain aspects the disclosure relates to a composition comprising a first compound that is a trigeminal nerve irritant, a second compound that is an animal repellent, and an acceptable carrier. In some embodiments, the trigeminal nerve irritant is selected from the group consisting of acetophenones, acetyl salicylic acid, acetylthiophenes, alanines, aminobenzoic acid, anilines, anisic acid, anthranilates, anthranilic acid, benzaldehyde, benzamide, benzoates, benzoic acid, benzothiole, benzyl acetate, capsaicin, cinnamamide, indole, isoquinoline, phenethanol, piperazine, pulegones, pyrazines, pyridines, pyrrole, salicyladehyde, salicyclic acid, thiazole, veratryl acetate, and combinations thereof. In some embodiments, the animal repellent is selected from the group consisting of acetophenones, allyl isothiocyanate, aluminum ammonium sulphate, anthranilates, caffeine, capsaicin, chlorpyrifos, cinnamic acid, cinnamic aldehyde, cinnamide, cyhalothrin, denatonium benzoate, emetine dihydrochloride, flutolanil, glucosinolate, magnesium sulfate, methiocarb, phenyl acetates, piperine, polygodial, pulegone, putrescent and volatile animal products, putrescent and volatile plant products, quebracho, quinine, quinine hydrochloride, quinones, sucrose octaacetate, thiram, TRPV1, veratrylamine, and combinations thereof. In some embodiments, the putrescent and volatile animal product is selected from the group consisting of eggs, urine, blood meal and castor oil. In some embodiments, the putrescent and volatile plant product is selected from the group consisting of pine needle oil, garlic oil, and sinigrin. In some embodiments, the trigeminal nerve irritant is methyl anthranilate. In some embodiments, the animal repellent is an anthraquinone compound. In some embodiments, the anthraquinone compound is 9,10-anthraquinone. In some embodiments, the composition comprises 1000 ppm to 150,000 ppm methyl anthranilate. In some embodiments, the composition comprises 1000 ppm to 15000 ppm methyl anthranilate. In some embodiments, the composition comprises 100 ppm to 5000 ppm anthraquinone. In some embodiments, the composition comprises 100 ppm to 30000 ppm anthraquinone.

In some embodiments, the ratio of methyl anthranilate to the anthraquinone compound is from 5:1 to 1:1. In some embodiments, the ratio of methyl anthranilate to anthraquinone is 5:1.

In certain aspects the disclosure relates to a method of repelling an animal from a substrate comprising applying to a substrate the composition of any one of claims 1 to 12, thereby repelling the animal from the substrate.

In certain aspects the disclosure relates to a method of enhancing animal repellency from a substrate comprising applying to a substrate the composition of any one of claims 1 to 12, thereby enhancing animal repellency from the substrate.

In some embodiments, the animal is a mammal. In some embodiments, the animal is not a bird. In some embodiments, the animal is selected from the group consisting of mice, voles, rats, rabbits, squirrels, prairie dogs, chipmunks raccoons, dogs, cats, groundhogs, foxes, skunks, opossums, deer, pigs, wolves, coyotes, boars, bears and moose. In some embodiments, the animal is a rabbit. In some embodiments, a combination of the trigeminal nerve irritant and the animal repellent enhances animal repellency to a greater extent than either compound alone. In some embodiments, the trigeminal nerve irritant and the animal repellent have a synergistic effect in enhancing animal repellency.

DETAILED DESCRIPTION OF THE INVENTION

I. Definitions

As used herein, the term "repellency" means the percent decrease in consumption (or occupancy) of a treated substrate relative to an untreated substrate. The term "effective repellency" means at least a 5% decrease in consumption (or occupancy) of a treated substrate relative to an untreated substrate. The effective repellency can be a 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% decrease in consumption (or occupancy) of a treated substrate relative to an untreated substrate. These values can be used to define a range, such as 50% to 75%, or 75% to 85%, or 25% to 50% decrease in consumption (or occupancy) of a treated substrate relative to an untreated substrate.

The term "relevant behavioral response" as used herein refers to the animal's reaction to effective repellency. For example, when an animal exhibits a relevant behavioral response of decreased consumption (or occupancy) of a treated substrate relative to an untreated substrate, that response is the result of effective repellency. In addition, the percentage values provided in the preceding paragraph can be used with the term "relevant behavioral response." For example, 50% repellency is equivalent to a behavioral response at a level of 50% decreased consumption (or occupancy) of a treated substrate relative to an untreated substrate.

II. Compositions

In certain aspects, the disclosure relates to a composition comprising a first compound that is a trigeminal nerve irritant, a second compound that is an animal repellent, and an acceptable carrier.

The trigeminal nerve is a cranial nerve responsible for sensation in the face and motor functions such as biting and chewing. The trigeminal nerve has three major branches: the ophthalmic nerve, the maxillary nerve, and the mandibular nerve. The ophthalmic and maxillary nerves are purely sensory, whereas the mandibular nerve supplies motor as well as sensory functions. Methyl anthranilate is a potent, congenital trigeminal nerve irritant in birds. For example, irritation of the trigeminal nerve by methyl anthranilate causes a reflexive avoidance response in birds (see, e.g., Kirifides et al., 2004, The Journal of Experimental Biology 207:715-722).

Trigeminal nerve irritants suitable for use in the present disclosure include, but are not limited to acetophenones, acetyl salicylic acid, acetylthiophenes, alanines, aminobenzoic acid, anilines, anisic acid, anthtranilates (e.g., methyl anthranilate (MA)), anthranilic acid, benzaldehyde, benzamide, benzoates, benzoic acid, benzothiole, benzyl acetate, capsaicin, cinnamamide, indole, isoquinoline, phenethanol, piperazine, pulegones, pyrazines, pyridines, pyrrole, salicyladehyde, salicyclic acid, thiazole, veratryl acetate, and combinations thereof. In a particular embodiment, the trigeminal nerve irritant is methyl anthranilate (MA).

Animal repellents suitable for use in the present disclosure include but are not limited to acetophenones, allyl isothiocyanate, aluminum ammonium sulphate, anthranilates, caffeine, capsaicin, chlorpyrifos, cinnamic acid, cinnamic aldehyde, cinnamide, cyhalothrin, denatonium benzoate, emetine dihydrochloride, flutolanil, glucosinolate, magnesium sulfate, methiocarb, phenyl acetates, piperine (e.g. Zanthoxylum piperitum), polygodial, pulegone, putrescent and volatile animal products (e.g. eggs, urine, blood meal, castor oil), putrescent and volatile plant products (e.g., pine needle oil, garlic oil, sinigrin), quebracho, quinine, quinine hydrochloride, quinones (e.g., an anthraquinone compound, such as 9,10-anthraquinone), sucrose octaacetate, thiram, TRPV1, veratrylamine, and combinations thereof.

In some embodiments, the animal repellent is an anthraquinone compound. In some embodiments, the animal repellent is 9,10-anthraquinone.

In some embodiments, the animal repellent is a polycyclic quinone. As used herein, the term "polycyclic quinone" refers to bicyclic, tricyclid and tetracyclic condensed ring quinones and hydroquinones, as well as precursors thereof. On the whole, the non-ionic polycyclic quinones and polycyclic hydroquinones (herein referred to collectively as PCQs) have very low solubility in water at ambient temperatures. In some embodiments, the PCQs have a water solubility no higher than about 1,000 ppm, by weight. Below is the chemical structure of the polycyclic quinone 9,10-anthraquinone:

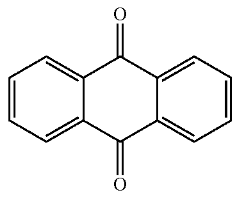 [SMILES: O=C1c2ccccc2C(=O)c2ccccc21]

However, as noted above, certain precursors of such PCQs can also be used in the invention, either combined with the relatively insoluble PCQs or by themselves. Such precursors are anionic salts of PCQs which are water soluble under alkaline anaerobic conditions. However, these materials are not stable and are easily converted to the insoluble quinone form upon exposure to air. Thus, when anionic PCQs are applied to plants and exposed to air, they are quickly changed to the water-insoluble, more active quinone form.

Among the water-insoluble PCQs that can be used in the invention are anthraquinone, 1,2-dihydroxy anthraquinone, 1,4-dihydroxy anthraquinone, naphthoquinone, anthrone(9,10-dihydro-9-oxo-anthracene), 10-methylene-anthrone, phenanthrenequinone and the alkyl, alkoxy and amino derivatives of such quinones, 6,11-dioxo-1H-anthra[1,2-c]pyrazole, anthraquinone-1,2-naphthacridone, 7,12-dioxo-7,12-dihydroanthra[1,2-b]pyrazine, 1,2-benzanthraquinone, 2,7-dimethylanthraquinone, 2-methylanthraquinone, 3-methylanthraquinone, 1-aminoanthraquinone and 1-methoxyanthraquinone. In addition, more complex polycyclic quinone compounds can be used, such as 2-carboxy-1,3,5,6,8-pentahydroxy-7-monosaccharide and other saccharides of anthraquinones or glucosamides and 2(1,3-dihydro-3-oxy-5-sulfo-2H-indol-2-ylidine)-2,3-dihydro-3-oxo-1H-indole-5-sulfonic acid, disodium salt. Of the foregoing cyclic ketones, anthraquinone and 1,4-dihydroxy-anthraquinone are preferred because they appear to be more effective. Naturally occurring anthraquinones can be used as well as synthetic anthraquinones.

Other PCQs which can be used include insoluble anthraquinone compounds, such as 1,8-dihydroxy-anthraquinone, 1-amino-anthraquinone, 1-chloro-anthraquinone, 2-chloro-anthraquinone, 2-chloro-3-carboxyl-anthraquinone and 1-hydroxy-anthraquinone. Various ionic derivatives of these materials can be prepared by catalytic reduction in aqueous alkali.

In some embodiments, the repellent is not a bird repellent. In some embodiments, the repellent is not an anthraquinone compound.

In some embodiments, the composition comprises an effective amount of the animal repellent. As used herein, an "effective amount" is defined as that amount which results in a significant repellence of the animals from a treated target or substrate in comparison to an untreated control target or substrate. The actual effective amount will vary with the particular repellent selected, its formulation, the animal, the target or substrate, and environmental factors, and may be readily determined by routine controlled experimentation. Suitable amounts and formulations are described in the prior art as noted hereinabove, and are also provided by the repellent manufacturers and suppliers. The concentration of a compound (e.g., an animal repellent or a trigeminal nerve agent) in the composition may be represented as parts per million (ppm), which is calculated by dividing the weight of the compound by the weight of the composition, and multiplying by one million. For example 1000 ppm animal repellent in the composition is equivalent to 0.1% wt/wt of the animal repellent in the composition. By way of example and without being limited thereto, an effective amount of the animal repellent (e.g., an anthraquinone compound) in the composition can be about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 6000, 7000, 8000, 9000, 10,000, 20,000, 30,000, 40,000 or 50,000 ppm. In some embodiments, the effective amount of the animal repellent (e.g., an anthraquinone compound) in the composition is greater than about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 6000, 7000, 8000, 9000, 10,000, 20,000, 30,000, 40,000 or 50,000 ppm. In some embodiments, the effective amount of the animal repellent (e.g., an anthraquinone compound) in the composition is less than about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 6000, 7000, 8000, 9000, 10,000, 20,000, 30,000, 40,000 or 50,000 ppm. Any of these amounts can also be used to define a range for the amount of the animal repellent in the composition, such as between about 1000 ppm and about 2000 ppm, between about 500 to about 1500 ppm, or between about 100 ppm and about 5000 ppm. In a particular embodiment, the composition comprises 1000 ppm of the animal repellent (e.g., anthraquinone).

In some embodiments, the composition comprises an effective amount of a trigeminal nerve irritant. By way of example and without being limited thereto, an effective amount of trigeminal nerve irritant (e.g., methyl anthranilate) in the composition can be about 1000, 5000, 10000, 20000, 30000, 40000, 50000, 60000, 70000, 80000, 90000, 100,000, 110,000, 120,000, 130,000, 140,000, 150,000, 160,000, 170,000, 180,000, 190,000 or 200,000 ppm. In some embodiments, the effective amount of trigeminal nerve irritant (e.g., methyl anthranilate) in the composition is greater than about 1000, 5000, 10000, 20000, 30000, 40000, 50000, 60000, 70000, 80000, 90000, 100,000, 110,000, 120,000, 130,000, 140,000, 150,000, 160,000, 170,000, 180,000, 190,000 or 200,000 ppm. In some embodiments, the effective amount of trigeminal nerve irritant (e.g., methyl anthranilate) in the composition is less than about 1000, 5000, 10000, 20000, 30000, 40000, 50000, 60000, 70000, 80000, 90000, 100,000, 110,000, 120,000, 130,000, 140,000, 150,000, 160,000, 170,000, 180,000, 190,000 or 200,000 ppm. Any of these amounts can also be used to define a range for the amount of trigeminal nerve irritant (e.g., methyl anthranilate) in the composition, such as less than about 10,000 ppm, between about 1000 ppm and about 10,000 ppm, between about 1000 ppm and about 9000 ppm, between about 4000 ppm and about 6000 ppm, between about 1000 ppm and about 50,000 ppm, between about 1000 ppm and about 150,000 ppm, or between about 1000 ppm and about 200,000 ppm. In a particular embodiment, the composition comprises about 5000 ppm trigeminal nerve irritant (e.g., methyl anthranilate). In some embodiments, the composition comprises about 5000 ppm methyl anthranilate and about 1000 ppm anthraquinone.

In some embodiments, the ratio of the trigeminal nerve irritant to the animal repellent in the composition is 25:1, 24:1, 23:1, 22:1, 21:1, 20:1, 19:1, 18:1, 17:1, 16:1, 15:1, 14:1, 13:1, 12:1, 11:1, 10.5:1, 10:1, 9.5:1, 9:1, 8.5:1, 8:1, 7.5:1, 7:1, 6.5:1, 6:1, 5.5:1, 5:1, 4.5:1, 4:1, 3.5:1, 3:1, 2.5:1, 2:1, 1.5:1, 1:1, 0.5:1, 0.4:1, 0.3:1, 0.2:1 or 0.1:1. In some embodiments the ratio of the trigeminal nerve irritant to the animal repellent in the composition is less than 25:1, 24:1, 23:1, 22:1, 21:1, 20:1, 19:1, 18:1, 17:1, 16:1, 15:1, 14:1, 13:1, 12:1, 11:1, 10.5:1, 10:1, 9.5:1, 9:1, 8.5:1, 8:1, 7.5:1, 7:1, 6.5:1, 6:1, 5.5:1, 5:1, 4.5:1, 4:1, 3.5:1, 3:1, 2.5:1, 2:1, 1.5:1, 1:1, 0.5:1, 0.3:1, 0.2:1 or 0.1:1. In some embodiments the ratio of the trigeminal nerve irritant to the animal repellent in the composition is greater than 25:1, 24:1, 23:1, 22:1, 21:1, 20:1, 19:1, 18:1, 17:1, 16:1, 15:1, 14:1, 13:1, 12:1, 11:1, 10.5:1, 10:1, 9.5:1, 9:1, 8.5:1, 8:1, 7.5:1, 7:1, 6.5:1, 6:1, 5:1, 4.5:1, 4:1, 3.5:1, 3:1, 2.5:1, 2:1, 1.5:1, 1:1, 0.5:1, 0.4:1, 0.3:1, 0.2:1 or 0.1:1. Any of these values may be used to define a range for the ratio of the trigeminal nerve irritant to the animal repellent in the composition. For example, in some embodiments, the ratio of the trigeminal nerve irritant to the animal repellent in the composition is 9:1 to 1:1, 7:1 to 1:1, or 5:1 to 1:1. In a particular embodiment, the ratio of the trigeminal nerve irritant to the animal repellent in the composition in the composition is 5:1.

In some embodiments the composition comprises methyl anthranilate (MA) and anthraquinone (AQ). In some embodiments the ratio of MA to AQ in the composition is 25:1, 24:1, 23:1, 22:1, 21:1, 20:1, 19:1, 18:1, 17:1, 16:1, 15:1, 14:1, 13:1, 12:1, 11:1, 10.5:1, 10:1, 9.5:1, 9:1, 8.5:1, 8:1, 7.5:1, 7:1, 6.5:1, 6:1, 5.5:1, 5:1, 4.5:1, 4:1, 3.5:1, 3:1, 2.5:1, 2:1, 1.5:1, 1:1, 0.4:1, 0.3:1, 0.2:1 or 0.1:1. In some embodiments the ratio of MA to AQ in the composition is less than 25:1, 24:1, 23:1, 22:1, 21:1, 20:1, 19:1, 18:1, 17:1, 16:1, 15:1, 14:1, 13:1, 12:1, 11:1, 10.5:1, 10:1, 9.5:1, 9:1, 8.5:1, 8:1, 7.5:1, 7:1, 6.5:1, 6:1, 5.5:1, 5:1, 4.5:1, 4:1, 3.5:1, 3:1, 2.5:1, 2:1, 1.5:1, 1:1, 0.5:1, 0.4:1, 0.3:1, 0.2:1 or 0.1:1. In some embodiments the ratio of MA to AQ in the composition is greater than 25:1, 24:1, 23:1, 22:1, 21:1, 20:1, 19:1, 18:1, 17:1, 16:1, 15:1, 14:1, 13:1, 12:1, 11:1, 10.5:1, 10:1, 9.5:1, 9:1, 8.5:1, 8:1, 7.5:1, 7:1, 6.5:1, 6:1, 5.5:1, 5:1, 4.5:1, 4:1, 3.5:1, 3:1, 2.5:1, 2:1, 1.5:1, 1:1, 0.5:1, 0.4:1, 0.3:1, 0.2:1 or 0.1:1. Any of these values may be used to define a range for the ratio of MA to AQ in the composition. For example, in some embodiments, the ratio of MA to AQ is 9:1 to 1:1, 7:1 to 1:1, or 5:1 to 1:1. In a particular embodiment, the ratio of MA to AQ in the composition is 5:1.

Compositions comprising the trigeminal nerve irritant and animal repellent can be formulated with an acceptable carrier as is known in the art. Formulations of the trigeminal nerve irritant and animal repellent can vary with the particular target or substrate and method of application. The compositions may, for example, be formulated as solutions, emulsions, emulsifiable concentrates, suspension concentrates, wettable powders, dusts, granules, adherent dusts or granules, and aerosols. In particular, the carrier can be agronomically acceptable and suitable for application onto structures, agricultural fields or crops, seeds, seedlings, orchards, vineyards, livestock feed, fertilizers, pesticides, animal or insect baits, and combinations thereof. The acceptable carrier can be a liquid or solid phase carrier, including but not limited to water, aqueous surfactant mixtures, alcohols, ethers, hydrocarbons, halogenated hydrocarbons, glycols, ketones, esters, oils (natural or synthetic), clays, kaolinite, silicas, cellulose, rubber, talc, vermiculate, and synthetic polymers. The trigeminal nerve irritant and animal repellent can be formulated in a single composition, or formulated in different compositions and applied separately. The trigeminal nerve irritant and animal repellent can also be formulated in admixture with other agriculturally beneficial agents, including but not limited to, ultraviolet stabilizers, antioxidants, baits, adjuvants, herbicidal agents, fertilizers, and pesticides including insecticides and fungicides. The compositions of the present disclosure can also contain one or more adjuvants, such as those routinely used in agriculture to adhere compounds to the surface of plant material.

The term "animal" as used herein refers to a non-human animal. In some embodiments, the animal to be repelled is a mammal. In some embodiments, the animal to be repelled is a dichromatic animal. Dichromatic animals are those animals that use only two distinct types of photoreceptors for color vision, generally including placental mammals and excluding sea mammals (pinnipeds and cetaceans; monochromats), primates closely related to humans (i.e. trichromats) and most birds (tetrachromats). In some embodiments, the animal to be repelled is selected from the group consisting of mice, voles, rats, rabbits, squirrels, prairie dogs, chipmunks, raccoons, dogs, cats, groundhogs, foxes, skunks, opossums, deer, pigs, wolves, coyotes, boars, bears and moose. In some embodiments, the animal is a rabbit. In some embodiments, the animal to be repelled is a bird. In some embodiments, the animal to be repelled is not a bird.

In some embodiments, the animal to be repelled is a rodent. Suitable rodents include, but are not limited to, mice and voles, field mice and meadow mice (Cricetidae); house mice, wood mice, black rats and brown rats (Muridae); ground squirrels, tree squirrels, flying squirrels, marmots and prairie dogs (Sciuridae)); pocket gophers (Geomyidae); mountain beaver (Aplodontidae); kangaroo rats, kangaroo mice and pocket mice (Heteromyidae); beavers (Castoridae); scaly-tailed squirrels (Anomaluridae); springhaas (Pedetidae); mole rats (Spalacidae and Bathyergidae); bamboo rats (Rhizomyidae); dormice (Gliridae, Platacanthomyidae and Seleviniidae); jumping mice (Zapodidae); jerboas (Dipodidae); porcupines (Hystricidae and Erethizontidae); cavies (Caviidae); capybara (Hydrochoeridae); pacaranas (Dinomyidae); agoutis and pacas (Dasyproctidae and Agoutidae); chinchillas and vizcachas (Chinchillidae); hutias (Capromyidae); nutria (Myocastoridae); hedge rats and octodonts (Octodontidae); tuco-tucos (Ctenomyidae); chinchilla rats (Abrocomidae); spiny rats (Echimyidae); cane rats (Thryonomyidae); dassie rats (Petromuridae); spring hare (Pedetidae) and gundis (Ctenodactylidae).

III. Methods

In certain aspects, the disclosure relates to a method of repelling an animal from a substrate comprising applying to a substrate a composition comprising a trigeminal nerve irritant and an animal repellent as described herein, thereby repelling the animal from the substrate.

The compositions described herein can be used to repel animals anywhere they pose a nuisance or, more importantly, to prevent or minimize economic damage, particularly to agricultural products. The trigeminal nerve irritant and animal repellent can be applied on any substrate or spatial location of concern from which animals are to be repelled. Particular substrates include, but are not limited to, one or more of physical structures (e.g., walls, fences or buildings), agricultural fields or crops, seeds, seedlings, orchards, vineyards, livestock feed, fertilizers, pesticides, animal or insect baits, and combinations thereof. Crops include, but are not limited to, one or more of corn, fruit, grains, grasses, legumes, lettuce, millet, oats, rice, row crops, sorghum, sunflower, tree nuts, turf, vegetables, and wheat.

In certain aspects, the disclosure relates to a method of enhancing animal repellency from a substrate comprising applying to a substrate a composition comprising a trigeminal nerve irritant and an animal repellent as described herein, thereby enhancing animal repellency from the substrate.

In some embodiments, applying the composition comprising a trigeminal nerve irritant and an animal repellent as described herein to the substrate enhances animal repellency relative to applying the trigeminal nerve irritant alone or the animal repellent alone. In some embodiments, the trigeminal nerve irritant and the animal repellent have an additive effect in enhancing animal repellency. In some embodiments, the trigeminal nerve irritant and the animal repellent have a synergistic effect in enhancing animal repellency. In some embodiments, applying the composition comprising a trigeminal nerve irritant and an animal repellent as described herein to the substrate enhances animal repellency by at least 1%, 2%, 3%, 4%, 5%, 6%, 7%, 8%, 9%, 10%, 15%, 20%, 25%, 30%, 35%, 45%, 50%, 60%, 70%, 80%, 90% or 100% relative to applying the trigeminal nerve irritant alone or the animal repellent alone.

EXAMPLES

Example 1. Evaluation of Repellency of Cottontail Rabbits from Whole Oats Treated with 10,000 ppm or 5000 ppm Methyl Anthranilate and 1000 ppm Anthraquinone

Methods

We conducted one no-choice feeding experiment for each unique combination of the trigeminal nerve irritant (methyl anthranilate) and the animal repellent (anthraquinone). For each feeding experiment, we used 24-30 cottontail rabbits to evaluate the efficacy of our repellent formulations. For each experiment, we offered untreated food for up to three days of the pretreatment and repellent-treated food during the 1-day test. For each experiment, our three test treatments (n=8–10 rabbits per treatment group) included food treated with (1) the methyl anthranilate alone, (2) the anthraquinone alone and (3) the combination of the methyl anthranilate and the anthraquinone.

Results

TABLE 1

Repellency from whole oats treated with 10,000 ppm MA and/or 1000 ppm AQ

| Treatment Group | % Repellency |
|---|---|
| 10,000 ppm methyl anthranilate (MA) alone | 62 |
| 1000 ppm anthraquinone (AQ) alone | 36 |
| 10,000 ppm MA + 1000 ppm AQ | 65 |

As shown in Table 1 above, although the combination of 10,000 ppm MA+1000 ppm AQ resulted in a small increase in repellency relative to 10,000 ppm MA alone (i.e., 65% vs. 62%, respectively), the repellency observed for the combination at this concentration of MA was lower than the additive effect of each compound alone (i.e., 62%+36%=88%).

TABLE 2

Repellency from whole oats treated with 5000 ppm MA and/or 1000 ppm AQ

| Treatment Group | % Repellency |
|---|---|
| 5000 ppm methyl anthranilate (MA) alone | 6% |
| 1000 ppm anthraquinone (AQ) alone | 36% |
| 5000 ppm MA + 1000 ppm AQ | 55% |

Reducing the concentration of MA in the composition from 10,000 ppm to 5000 ppm greatly reduced the repellency activity of the composition from 62% to 6% when the MA was used alone. See Tables 1 and 2 above. Surprisingly, although combining MA with AQ at the higher concentration of MA (i.e., 10,000 ppm) had little effect on repellency, combining MA with AQ at the lower concentration (i.e., 5000 ppm) greatly increased repellency relative to either compound alone. For example, the combination of 5000 ppm MA+1000 ppm AQ provided greater repellency (55% repellency) than either 5000 ppm MA alone (6% repellency) or 1000 ppm AQ alone (36% repellency) in cottontail rabbits. The 55% repellency observed for the combination of 5000 ppm MA+1000 ppm AQ was greater than the additive effect of each compound alone (i.e., 6%+36%=42%). Accordingly, these results demonstrate a synergistic effect for the combination of 5000 ppm MA+1000 ppm AQ in repelling cottontail rabbits.

The invention claimed is:

1. A composition comprising a first compound that is a trigeminal nerve irritant, a second compound that is an animal repellent, and an acceptable carrier, wherein the trigeminal nerve irritant is methyl anthranilate, the animal repellent is anthraquinone, and the ratio of methyl anthranilate to anthraquinone is 5:1.

2. The composition of claim 1, wherein the anthraquinone is 9,10-anthraquinone.

3. The composition of claim 1, wherein the composition comprises 1000 ppm to 150,000 ppm methyl anthranilate.

4. The composition of claim 1, wherein the composition comprises 1000 ppm to 15000 ppm methyl anthranilate.

5. The composition of claim 1, wherein the composition comprises 100 ppm to 5000 ppm anthraquinone.

6. The composition of claim 1, wherein the composition comprises 100 ppm to 30000 ppm anthraquinone.

7. A method of repelling an animal from a substrate comprising applying to a substrate the composition of claim 1, thereby repelling the animal from the substrate.

8. A method of enhancing animal repellency from a substrate comprising applying to a substrate the composition of claim 1, thereby enhancing animal repellency from the substrate.

9. The method of claim 7, wherein the animal is a mammal.

10. The method of claim 7, wherein the animal is selected from the group consisting of mice, voles, rats, rabbits, squirrels, prairie dogs, chipmunks raccoons, dogs, cats, groundhogs, foxes, skunks, opossums, deer, pigs, wolves, coyotes, boars, bears and moose.

11. The method of claim 7, wherein a combination of the trigeminal nerve irritant and the animal repellent enhances animal repellency to a greater extent than either compound alone.

12. The method of claim 7, wherein the trigeminal nerve irritant and the animal repellent have a synergistic effect in enhancing animal repellency.

* * * * *